US012267311B2

(12) United States Patent
Garg

(10) Patent No.: US 12,267,311 B2
(45) Date of Patent: *Apr. 1, 2025

(54) SYSTEMS AND METHODS FOR RESTRICTING SECURITY CONNECTION DATA RESETS

(71) Applicant: Truist Bank, Charlotte, NC (US)

(72) Inventor: Sidharth Garg, Atlanta, GA (US)

(73) Assignee: TRUIST BANK, Charlotte, NC (US)

( * ) Notice: Subject to any disclaimer, the term of this patent is extended or adjusted under 35 U.S.C. 154(b) by 176 days.

This patent is subject to a terminal disclaimer.

(21) Appl. No.: 18/155,812

(22) Filed: Jan. 18, 2023

(65) Prior Publication Data

US 2024/0244041 A1 Jul. 18, 2024

(51) Int. Cl.
H04L 29/06 (2006.01)
H04L 9/40 (2022.01)
H04L 41/0813 (2022.01)

(52) U.S. Cl.
CPC .......... *H04L 63/08* (2013.01); *H04L 41/0813* (2013.01); *H04L 63/102* (2013.01)

(58) Field of Classification Search
None
See application file for complete search history.

(56) References Cited

U.S. PATENT DOCUMENTS

| | | | | |
|---|---|---|---|---|
| 7,793,835 B1 * | 9/2010 | Coggeshall | ............ | G06Q 20/40 235/375 |
| 8,386,377 B1 * | 2/2013 | Xiong | .................... | G06Q 20/04 707/706 |
| 10,445,514 B1 * | 10/2019 | Brandwine | ......... | G06F 21/6209 |
| 10,521,857 B1 * | 12/2019 | Shao | ....................... | G06Q 40/02 |
| 10,783,520 B2 * | 9/2020 | Moss | ................. | G06Q 20/4016 |
| 11,017,464 B1 * | 5/2021 | Harris | ................. | H04L 63/1416 |
| 11,610,278 B2 * | 3/2023 | Clark | ..................... | G06Q 40/02 |

(Continued)

FOREIGN PATENT DOCUMENTS

JP 3923312 B2 5/2007

OTHER PUBLICATIONS

Lempereur, Kira, "Account Takeover Prevention: How to Prevent ATO & Mitigate Fraud", Nov. 10, 2022, Datadome.co, https://datadome.co/guides/account-takeover/how-to-prevent-account-takeover-attacks/, accessed Dec. 5, 2024, p. 1-8. (Year: 2022).*

*Primary Examiner* — Jeffery L Williams
(74) *Attorney, Agent, or Firm* — Michael A. Springs, Esq.; Shumaker, Loop & Kendrick, LLP; Patrick B. Horne

(57) ABSTRACT

A system maintains values for secure connection settings for multiple registered users and restricts data resets. Upon receiving a reset request to reset the value of a particular secure connection setting for a specific user, trials are conducted each by: providing a reset tool to the requesting device for input of a requested new value for the secure connection setting; receiving the requested new value from the requesting device; and sending a validation request to a validation system, the validation request including, at least in part, the requested new value for the particular secure connection setting. If a reply from the validation system is deemed a repudiation of the requested new value, a trial count is tolled. If the trial count reaches a predetermined condition, trials are suspended, a denial message is sent to the requesting device, and the specific user is alerted of a attempt to alter their data.

13 Claims, 7 Drawing Sheets

(56) References Cited

U.S. PATENT DOCUMENTS

| | | | |
|---|---|---|---|
| 11,704,679 B2* | 7/2023 | Epstein | G06Q 40/02 |
| | | | 705/35 |
| 11,843,617 B2* | 12/2023 | Lee | H04L 63/1425 |
| 12,051,072 B1* | 7/2024 | Moss | G06Q 20/4016 |
| 12,093,375 B2* | 9/2024 | Endler | H04L 9/002 |
| 12,120,126 B2* | 10/2024 | Aguayo | H04L 63/083 |
| 12,125,039 B2* | 10/2024 | Kramme | G06Q 20/34 |
| 12,137,114 B2* | 11/2024 | Vlahovic | G06Q 50/265 |
| 12,137,117 B2* | 11/2024 | Spitler | H04L 63/1416 |
| 12,153,666 B1* | 11/2024 | Katz | G06F 21/552 |
| 2004/0249961 A1 | 12/2004 | Katsube | |
| 2005/0193075 A1 | 9/2005 | Haff | |
| 2007/0260884 A1 | 11/2007 | Venkitaraman | |
| 2008/0114885 A1* | 5/2008 | Kulkarni | H04L 67/1001 |
| | | | 709/229 |
| 2009/0310528 A1 | 12/2009 | Tamura | |
| 2011/0055404 A1 | 3/2011 | Joyce | |
| 2012/0054498 A1 | 3/2012 | Rickman | |
| 2015/0256525 A1 | 9/2015 | Takaoka | |
| 2016/0147989 A1 | 5/2016 | Venkata Dongala | |
| 2017/0109855 A1* | 4/2017 | Stockton | G06Q 50/265 |
| 2018/0220475 A1 | 8/2018 | Tsurumi | |
| 2019/0222606 A1* | 7/2019 | Schweighauser | G06N 5/02 |
| 2019/0244217 A1* | 8/2019 | Shaw | G06Q 30/0185 |
| 2020/0066379 A1 | 2/2020 | Chapman | |
| 2020/0118235 A1* | 4/2020 | Clark | H04M 15/47 |
| 2020/0242219 A1 | 7/2020 | Kaczynski | |
| 2020/0329025 A1 | 10/2020 | Kahn | |
| 2021/0221125 A1 | 7/2021 | Panshin | |
| 2021/0241288 A1* | 8/2021 | Doreswamy | G06Q 30/016 |
| 2022/0247765 A1* | 8/2022 | Lee | G06Q 20/3827 |
| 2023/0086281 A1* | 3/2023 | Kaidi | H04L 63/20 |
| | | | 726/22 |
| 2023/0199002 A1* | 6/2023 | Kaidi | H04L 63/1425 |
| | | | 726/22 |
| 2023/0336571 A1* | 10/2023 | Costa | G06N 3/04 |
| 2024/0089262 A1* | 3/2024 | Legault | G06Q 20/4016 |
| 2024/0195828 A1* | 6/2024 | Panasiuk | H04L 63/1425 |
| 2024/0202309 A1* | 6/2024 | Brown | G06F 21/45 |
| 2024/0244041 A1* | 7/2024 | Garg | H04L 41/0813 |
| 2024/0244043 A1* | 7/2024 | Garg | H04L 41/0813 |
| 2024/0314125 A1* | 9/2024 | Shaffer | H04L 63/0861 |
| 2024/0403885 A1* | 12/2024 | Bashore | G06Q 20/4016 |

* cited by examiner

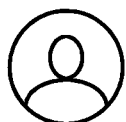 Personal Information  270

Mailing Address

We'll send information about your account and online profile to your primary address. Add additional addresses if you want us to send information for any offers somewhere else.

Primary Address
123 Somewhere Street
Some City, State 12345

Your primary address can't be deleted.

Secondary Mailing Address (Optional)
P.O. Box 54321
Someother City, State 67890

Associated Accounts
Retail Account *00NN

Email Address
name@domain.extension

Associated Accounts
Retail Account *00NN

SYSTEMS AND METHODS FOR RESTRICTING SECURITY CONNECTION DATA RESETS

TECHNICAL FIELD

The present disclosure relates to computer network security. More particularly, the present disclosure relates to improving security against repetitive, iterative, and high-volume attempts to alter security connection data such as account contact information.

BACKGROUND

Consumers are increasingly conducting business and exchanging private information online. Information and account security is of utmost importance for consumer confidence and business success. Whether accessing financial accounts, socializing, or enjoying streaming media, consumers expect the companies, social media sites, and content providers that conduct business online to maintain account information as private and secure, despite that users occasionally change their contact information, with reference to their phone numbers, their email addresses, their physical mailing addresses, and other details relating to themselves and/or their preferred modes of contact.

Measures are taken to defeat schemes in which one or more contact modes are altered, such as a phone number or email address, ahead of more damaging fraudulent activities such as funds transfers or purchases made on user funds. If notifications of such activities can be redirected from reaching customers or otherwise defeated even temporarily, funds and other resources can reach the hands of fraudulently acting parties. Whether users whose accounts are compromised are held directly accountable for the losses, or whether fraudulent transactions are guaranteed by, for example, institutions that issue credit cards and other electronic payment vehicles, ultimately the costs of losses are passed on to consumers, whether individually or as a whole.

Some businesses and other entities maintaining user accounts turn to third party service providers to confirm user identities and contact information, particularly when changes to user account details such as contact information items are requested. Such third parties may charge a fee for each confirmation or denial, or may charge for periodic subscriptions with limits on usage or rates that vary according to volume. Fraudulent schemes vary in their strategies, some of which entail repeated attempts by an agent, or iterative or high-volume attempts, executed for example by malicious code or other programming, to access accounts, open accounts, and/or alter data. Thus, schemes where fraudulently acting parties use brute force or other repeated attacks can lead to considerable costs for entities requesting confirmations, even when denials are made and user accounts remain uncompromised.

Improvements are needed for improving account securities and the costs therefor, particularly in environments permitting multiple account alteration attempts for which expenditures are exacted or associated with each attempt or rates that vary therewith.

SUMMARY

This summary is provided to briefly introduce concepts that are further described in the following detailed descriptions. This summary is not intended to identify key features or essential features of the claimed subject matter, nor is it to be construed as limiting the scope of the claimed subject matter.

According to at least one embodiment, a system for restricting security connection data resets includes a computing system of a first entity including one or more processor. At least one of a memory device and a non-transitory storage device maintains values for respective secure connection settings for each user of multiple registered users each having one or more user device. A communication interface operatively connects, via a communication network, the one or more processor to the one or more user device of each of the multiple registered users, and to a validation entity computing system of a validation service entity. Upon execution of computer-readable instructions by the one or more processor, the computing system performs steps, for a specific user of the multiple registered users, and upon receiving a reset request from a requesting device to reset the value of a particular secure connection setting for the specific user, conducting multiple trials in succession, by, for each of the multiple trials: providing a reset tool to the requesting device for input of a requested new value for the particular secure connection setting; receiving the requested new value from the requesting device; sending a validation request to the validation entity computing system, the validation request including, at least in part, the requested new value for the particular secure connection setting; receiving, from the validation entity computing system, a repudiation of the requested new value for the particular secure connection setting; and tolling a trial count. Upon the trial count reaching a predetermined condition, the computing system suspends the conducting of the multiple trials, sends a denial message to the requesting device, and sends an alert of the request to reset the value of a particular secure connection setting to at least one user device of the one or more user device of the specific user according to at least one maintained value of the secure connection settings for the specific user.

In at least one example, upon the trial count reaching a predetermined condition, the computing system further maintains the values for respective secure connection settings for the specific user against unassisted machine-conducted resets.

In at least one example, upon the trial count reaching a predetermined condition, the computing system further maintains the values for respective secure connection settings for the specific user against unassisted machine-conducted resets for a delay interval.

Upon the trial count reaching a predetermined condition, the computing system may permit resets, conducted by a human agent of the first entity, within the delay interval, of the secure connection settings for the specific user.

The repudiation of the requested new value for the particular secure connection setting may be or may include a score assessing likelihood of authenticity of the requested new value for the particular secure connection setting.

Maintaining values for respective secure connection settings may include maintaining addresses for user contact.

The reset request from the requesting computing device may be initiated by a malicious entity.

The validation request in some examples identifies the specific user.

According to at least one embodiment, a system for restricting security connection data sets includes a computing system of a first entity including one or more processor configured to execute computer-readable instructions, at least one of a memory device and a non-transitory storage device for maintaining values for respective secure connection settings for each user of multiple registered users each having one or more user device, and a communication interface for operatively connecting, via a communication network, the one or more processor to the one or more user device of each of the multiple registered users, and to a validation entity computing system of a validation service entity. Upon execution of the computer-readable instructions, the computing system performs steps including, for a specific user upon receiving a set request, from a requesting device, to set the value of a particular secure connection setting for the specific user, conducting multiple trials in succession, by, for each of the multiple trials: providing a set tool to the requesting device for input of a requested new value for the particular secure connection setting; receiving the requested new value from the requesting device; sending a validation request to the validation entity computing system, the validation request identifying the specific user and including, at least in part, the requested new value for the particular secure connection setting; receiving, from the validation entity computing system, a repudiation of the requested new value for the particular secure connection setting; and tolling a trial count. Upon the trial count reaching a predetermined condition, the computing system further suspends the conducting of the multiple trials, sends a denial message to the requesting device, and restricts values of secure connection settings for the specific user from being set.

Upon the trial count reaching a predetermined condition, the computing system may further restrict the values of secure connection settings for the specific user from being set unassisted by machine.

Upon the trial count reaching a predetermined condition, the computing system further restricts the values of secure connection settings for the specific user from being set unassisted by machine for a delay interval.

Upon the trial count reaching a predetermined condition, the computing system may further permit setting, conducted by a human agent of the first entity, within the delay interval, of secure connection settings for the specific user.

In at least one embodiment, a method is provided for a computing system of a first entity to restrict security connection data resets. The computing system includes one or more processor configured to execute computer-readable instructions, at least one of a memory device and a non-transitory storage device maintaining values for respective secure connection settings for each user of multiple registered users each having one or more user device, and a communication interface for operatively connecting, via a communication network, the one or more processor to the one or more user device of each of the multiple registered users, and to a validation entity computing system of a validation service entity. The method includes, upon execution of the computer-readable instructions, and upon receiving a reset request, from a requesting device, to reset the value of a particular secure connection setting of the secure connection settings for a specific user of the multiple registered users conducting multiple trials in succession. Each trial is conducted by: providing a reset tool to the requesting device for input of a requested new value for the particular secure connection setting; receiving the requested new value from the requesting device; sending a validation request to the validation entity computing system, the validation request including, at least in part, the requested new value for the particular secure connection setting; receiving, from the validation entity computing system, a repudiation of the requested new value for the particular secure connection setting; and tolling a trial count. Upon the trial count reaching a predetermined condition, the method further includes suspending the conducting of the multiple trials, sending a denial message to the requesting device, and sending an alert of the request to reset the value of a particular secure connection setting to at least one user device of the one or more user device of the specific user according to at least one maintained value of the secure connection settings for the specific user.

The above summary is to be understood as cumulative and inclusive. The above described embodiments and features are combined in various combinations in whole or in part in one or more other embodiments.

BRIEF DESCRIPTION OF THE DRAWINGS

The previous summary and the following detailed descriptions are to be read in view of the drawings, which illustrate some, but not all, embodiments and features as briefly described below. The summary and detailed descriptions, however, are not limited to only those embodiments and features explicitly illustrated.

FIG. 2 displays account records for which values are maintained as secure connection settings.

FIG. 7 represents the display of maintained account records as shown in FIGS. 2 and 6, with another notification according to various embodiments of the present invention.

DETAILED DESCRIPTIONS

Figure 1:
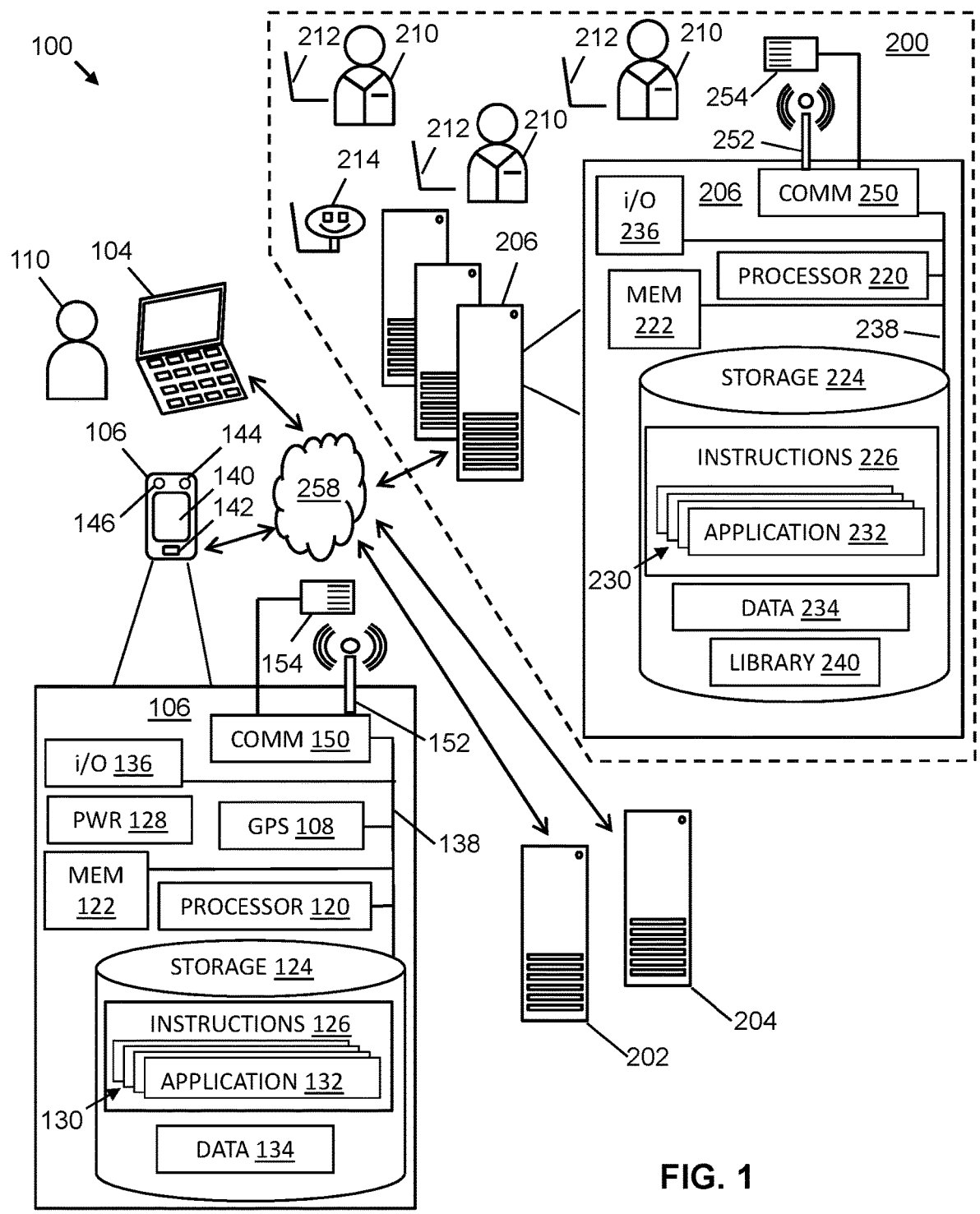
FIG. 1 illustrates an enterprise system for at least restricting security connection data resets, and environment thereof, in accordance with various embodiments of the present invention.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although steps may be expressly described or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Like reference numbers used throughout the drawings depict like or similar elements. Unless described or implied as exclusive alternatives, features throughout the drawings and descriptions should be taken as cumulative, such that features expressly associated with some particular embodiments can be combined with other embodiments.

Unless defined otherwise, technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to illustrations and/or block diagrams of systems and apparatuses (the term "apparatus" includes systems and computer program products), will be understood such that each function described or implied with reference to the illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts described, illustrated, and/or implied.

These computer program instructions may also be stored in a computer-readable memory that can direct a computer or other programmable data processing apparatus to function in a particular manner, such that the instructions stored in the computer readable memory produce an article of manufacture including instructions, which implement the function/act described, illustrated, and/or implied.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts described, illustrated, and/or implied. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The environment may include, for example, a distributed cloud computing environment (private cloud, public cloud, community cloud, and/or hybrid cloud), an on-premise environment, fog computing environment, and/or an edge computing environment. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, IOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

According to various embodiments, the memory device 122 and storage device 124 may be combined into a single storage medium. The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Further non-limiting examples of input devices and/or output devices include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The input and output system 136 may also be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a global positioning system device (GPS) configured to be used by a positioning system to determine a location of the computing device 104 or mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third and fourth party systems such as merchant systems configured to interact with the user device 106 during transactions and also configured to interact with the enterprise system 200 in back-end transactions clearing processes.

In certain embodiments, one or more of the systems such as the user device (referring to either or both of the computing device 104 and the mobile device 106), the enterprise system 200, and/or the external systems 202 and 204 are, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

The above-described devices and systems facilitate implementing improved account security, particularly in environments permitting multiple account detail alteration attempts. In the following descriptions, a first entity maintains values for respective secure connection settings for each user of multiple registered users. Such secure connection settings refer at least to settings by which the first entity can connect to second entities, with reference at least to users, for secure individual communications. First, second, third, and so fourth secure connection settings can be used by the first entity for contacting a user, for example to confirm account profile details, to receive statements and offers, and to generally conduct communications between the first entity, and the second entity, with reference to any specific user. Thus, such settings can refer to phone numbers, email addresses and other contact mode settings.

Thus for each registered user, for example, a secure connection setting can refer to an email address, the value of the setting being one or more of the specific user name, domain, and extension (name@domain.extension). For each registered user, for example, a secure connection setting can refer to a physical address, the value of the setting being the specific physical mailing, residential, or business address including one or more of an address number, a street name, a city, a state, and a zip code. Such examples are represented in FIG. 2, in which sections of personal information for a particular user are shown to represent maintained account and/or profile records, and which may be shown together as a display 270, for inspection by the particular user 100 (FIG. 1) or human agents 210 of the first entity.

In another example as detailed in the following descriptive scenario with reference to FIGS. 3-7, a secure connection setting can refer to a phone number, the value of the setting being the specific digits of the number by which a user can be reached. These express examples can be used in coordination or separately to reach a user. Additional and alternative examples may be maintained, such as, secondary phone numbers and non-primary addresses and second mailing addresses. For example, respective values may be maintained for home, office, and mobile numbers.

In some embodiments described herein, the first entity referenced herein provides financial services and operates as a financial institution. The first entity may be previously and currently engaging a user in a range of services such as checking, credit card, debit card, mortgage, and savings account services. In such cases, where the user is a highly engaged client, the service entity has direct access to data regarding credit cards, checking, savings, and other financial arrangements and means. In such examples and others, the first entity maintains account records, each associated with a respective one of multiple user entities, for example as represented in FIG. 1 as data 234, which can include, as non-limiting examples, cached data, and files such as those for user accounts, user profiles, account balances, and transaction histories. The first entity also maintains values for respective secure connection settings for each user of multiple registered users, with reference as described above to phone numbers, email addresses and other contact mode settings.

For security and confidentiality purposes, account records are generally secured from unauthorized access and alteration. Thus, the account records of a particular user are inaccessible without user authentication. However, even prior to or without such authentication, an agent or system of the first entity may conduct a communication session and provide information, for example, about multiple services made available at least in part by the first entity. In examples of the first entity providing financial services and/or operating as a financial institution, the services made available and for which information can be disseminated prior to or without user authentication can include, as non-limiting examples, policies and offerings for checking, credit card, debit card, mortgage, and savings account services, and the information disseminated can be provided without specific user account details in the absence of user authentication.

The account records of a particular user, in some examples, are made accessible to the user upon user authentication by the user. For example, a username and password may be provided to satisfy user authentication and/or further security measures may be applied. Upon user authentication, user access to accounts and actions may be permitted such as balance requests, funds transfers, funds conversions, and other information access and actions regarding user owned or user associated assets.

Upon user authentication, requests for setting and/or resetting the respective values of particular secure connection settings may be received and authorized, such as when a user changes their email address and/or their phone number, or wishes to alter the way in which they can be reached by the first entity. In order to prevent fraudulent or erroneous setting and/or resetting of the secure connection settings, the first entity can turn to a third party service provider, referenced herein as a validation service entity having a validation entity computing system. The first entity, for example, may have a service arrangement such as a membership, a subscription, and/or a contract with the validation service entity. The validation service entity may serve as a contact information validation service by providing validations and/or repudiations of values of secure connection settings such as consumer email addresses, phone numbers and other connection and contact modes. Validations attest to whether a requested new value for a secure connection setting is accurate, genuine and current. Repudiations can indicate that a requested new value for a secure connection setting is inaccurate, disingenuous, obsolete, and/or outdated, thus possible representing a fraudulent or erroneous attempt to alter contact information.

The validation service entity can maintain or access databases having information accumulated and/or available in public records, online search engines, and credit reporting agencies. Consumers, for example, tend to have financial, personal, professional, and other arrangements with multiple parties and entities, such that email addresses, phone numbers, and other contact modes can be cross-referenced by multiple entities for verification. A requested new value for a secure connection setting sent to the validation service entity can be checked against such information accumulated or and/or available.

The validation computing system and computing system of the first entity, in some uses and examples, processes a validation request automatically without human agent assistance or intervention in order to facilitate rapid and high volume business. Thus, from the sending of a validation request to the validation entity computing system by the first entity computing system, through the analysis of the request by the validation entity computing system, to the reply by the validation entity computing system to the first entity computing system, minimized latency is provided. Thus, a consumer, for example, attempting to update or change the value of a secure connection setting maintained by the first entity computing system may proceed in real time with minimal or no perceived delay.

Reply by the validation entity computing system to the first entity computing system can be an essentially absolute validation, an essentially absolute negation, or a more non-binary indication. The reply, made by the validation entity computing system, can be or can include a score calculated or generated to represent a likelihood of accuracy and/or inaccuracy. The first entity computing system, in some implementations, determines whether a score received from the validation entity computing system by the first entity computing system is deemed a validation or a repudiation. In some examples, such determinations are made automatically by the first entity computing system. A score indicating high adverse risk or likelihood of inaccuracy can be automatically categorized as a repudiation, and a score indicating little or no such risk or likelihood can be automatically categorized as a validation. The score can be, for example, in the form of a percentage, and validation versus repudiation can be determined according to a threshold percentile against which the received percentage score is compared. In some implementations a relatively high score represents a relatively high likelihood of accuracy, and thus meeting or exceeding the threshold is automatically categorized as a validation, whereas failure to meet or exceed the threshold is automatically categorized as a repudiation. In other implementations a relatively high score represents a relatively high likelihood of inaccuracy, and thus meeting or exceeding the threshold is automatically categorized as a repudiation, whereas failure to meet or exceed the threshold is automatically categorized as a validation.

Measures are taken, in some embodiments of systems and methods within the scope of these descriptions, to facilitate requests despite occasional human errors and/or other inaccuracies or incongruences. For example, a user can be offered multiple trials when requesting a new value for a secure connection setting. When a new value is deemed as repudiated, the user can try again, and at another attempt, may enter correct information, according to the validation entity computing system, and then the entity computing system can set or reset the value for which the user request was made. Thus users can set or reset the values of secure connection settings maintained by the first entity computing system to, for example, update or change contact information.

Figure 3:
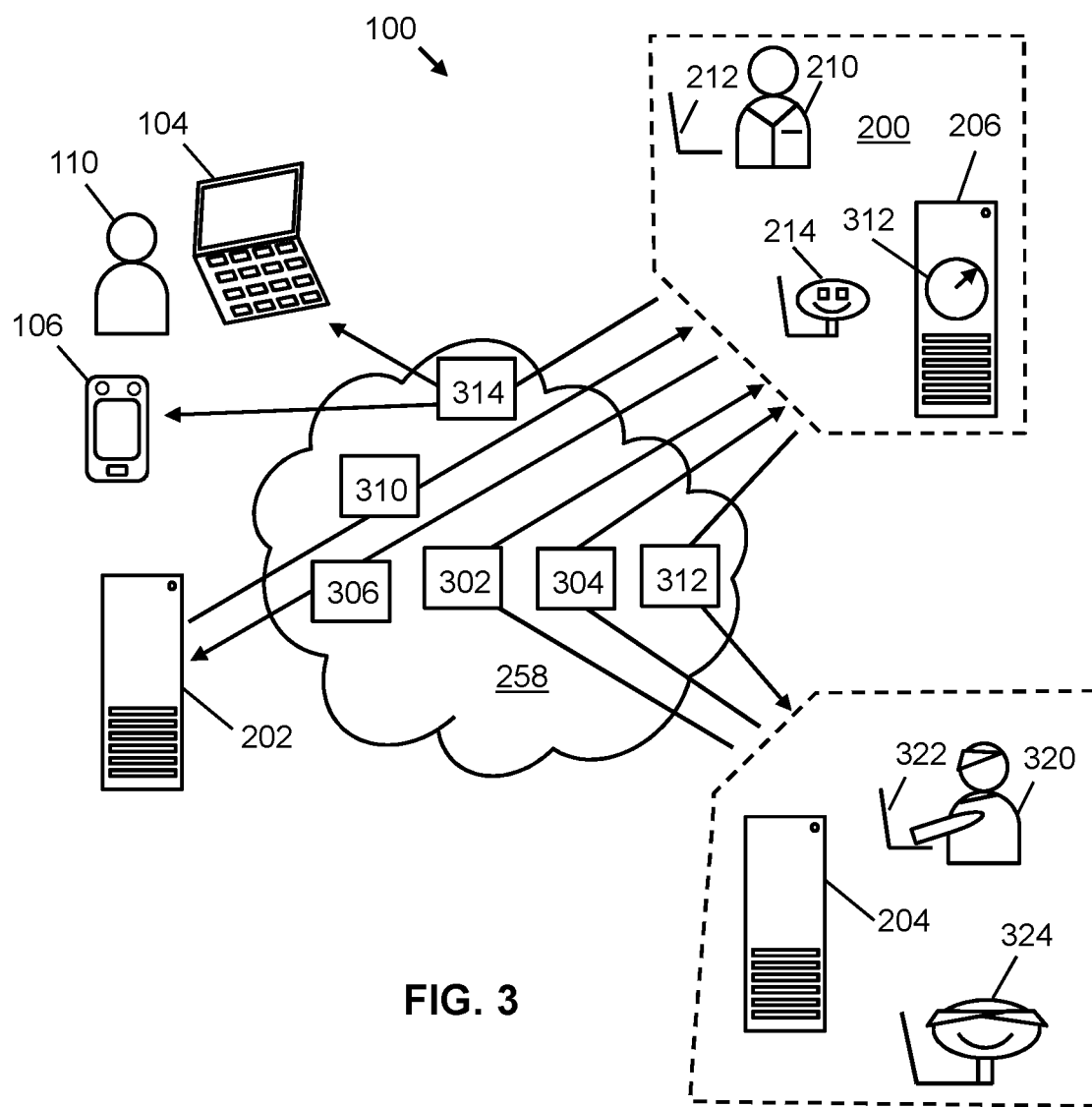
FIG. 3 illustrates the system of FIG. 1 and an environment thereof in which a validation service entity is engaged with regard to a reset request made by a malicious entity or other party.

Measures are also taken to defeat schemes in which multiple attempts at setting and/or resetting the values of secure connection settings are made by a malicious entity or other party, referenced herein as a fourth entity. For illustration and description of at least one non-limiting implementation and example of use for devices, systems, and methods described herein, for restricting security connection data resets, FIG. 3 illustrates the system 100 of FIG. 1, and environment thereof, according to at least one embodiment, in which a computing system 206 of a first entity, operating, managing or diagrammatically represented by, the system 200, is engaged in operative communications via the network connection 258, with: the user devices of multiple registered users, one of whom is referenced in FIG. 3 as a second entity or user 110 having user devices 104 and 106; an external system 202 serving in this example as a validation entity computing system of a third entity or validation service entity; and an external system 204 serving in this example as fourth entity computing system or device, referenced in the following as a requesting device 204.

In this example, the fourth entity sends a reset request 302 (FIG. 3) from the requesting device 204 to reset the value of a particular secure connection setting for the specific user 110. In the illustrated example, the reset request from the requesting computing device may be initiated by a malicious fourth entity 320. The reset request 302 may be sent from a fourth entity agent device 322 or a fourth entity virtual agent 324. Upon receiving the reset request 302, the first entity computing system 206 conducts one or more trials, in succession if multiple trials are necessitated. In each such trial, the first entity computing system provides a reset tool to the requesting device for input of a requested new value for the particular secure connection setting for which a reset is requested.

Figure 4:
FIG. 4 shows a reset tool graphically represented in or as a display of settings options and an entry field in which the digits of a requested new value for a particular secure connection setting can be entered.
Figure 5:
FIG. 5 shows the display of the reset tool of FIG. 4 as including a notification.

A reset tool 330 is graphically represented in FIG. 4 as a display of settings options and, in the illustrated example, an entry field 332 in which the digits of a requested new value for a particular secure connection setting can be entered. In the scenario of FIG. 4, the reset tool 330 may be displayed by the agent device 322 or may be utilized, with or without display thereof to a human agent, by the virtual agent 324. In examples in which the reset tool 330 is to be displayed, providing the reset tool 330 refers at least to causing the display thereof.

The secure connection setting for which the reset request is made in the illustrated example (FIG. 4) is indicated as a primary phone number. The requested new value 304 is sent to the first entity computing system 206, for example by directing a cursor to the submit box 334 and a click or other entry indication.

The first entity computing system receives the requested new value 304 from the requesting device 204 and sends a validation request 306 (FIG. 3) to the validation entity computing system 202, the validation request including, at least in part, the requested new value for the particular secure connection setting and information unambiguously identifying the specific user.

As described in the preceding, a reply 310 is generated and sent by the validation entity computing system to the first entity computing system. The reply 310, which is received from the validation entity computing system 202 by the first entity computing system 206, is characterized or deemed in this descriptive non-limiting example as a repudiation of the requested new value 304 for the particular secure connection setting, thus indicating the requested new value 304 is inaccurate, disingenuous, obsolete, and/or outdated and possibly representing a fraudulent or erroneous attempt to alter contact information. The first entity computing system 206 accordingly does not replace the maintained value with the requested new value, and instead maintains the prior or current value. Thus, by use of the validation service provided by the validation entity computing system 202, the value of the secure connection setting for which the request reset was made is maintained without revision, for the described trial.

For each such trial, for example described as resulting in the first entity computing system 206 receiving a reply deemed a repudiation of a requested new value 304, a trial count 312 (FIG. 3) is tolled to enumerate or otherwise quantify, and ultimately limit, the number of trials that can be submitted by the requesting device 202, thus thwarting fraudulent schemes in which repeated attempts are made, for example iteratively, in high-volume, and/or executed for example by malicious code or other programming for example by use of or represented by the virtual agent 324.

Tolling the trial count 312 refers, in various non-limiting examples, simple counting by incrementing at each trial (counting up), counting down by decrementing from a starting point number, calculating a rate of trials over time, calculating time periods between trials, and calculating other summations and time-related functions with respect to trials. A trial, as described herein, refers at least to the sequence of events already described with reference to the request 302, the reset tool 330, a requested new value 304, a validation request 306, and a reply 310.

In some examples, in which a reply received from the validation entity computing system 202 by the first entity computing system 206 is characterized as a validation of the requested new value 304 for the particular secure connection setting, thus indicating the requested new value 304 is accurate, the value of the secure connection setting of the reset request was made is set or reset to the requested new value and no further trials are conducted for the reset request.

In the ongoing exemplary descriptive scenario FIGS. 3-7, in which received replies 310 are deemed as repudiations, multiple trials are conducted in succession until the trial count reaches a predetermined condition, such as a maximum number of trials have been completed according to simple counting, or other condition according to other modes by which a trial count can be tolled. Upon the trial count reaching a predetermined condition, the first entity computing system suspends the conducting of the multiple trials, the first entity computing system sends a denial message 312 to the requesting device, and sends an alert 314 of the request to reset the value of a particular secure connection setting to at least one user device (104, 106) of the specific user 110 according to at least one maintained value of the secure connection settings for the specific user.

Thus, the specific user 110 is informed of a denied attempt to reset the value of a particular secure connection setting. The alert 314 in some examples includes an invitation to contact the first entity, particularly in the event that the specific user 110 is otherwise unaware of the activities of the fourth entity 320. In some examples, the alert 314 includes identifying information about the fourth entity 320, the requesting device 204, and/or the fourth entity agent device 322, such as device names, device models, IP addresses, and/or approximate physical locations. The user 110 is thus empowered by the alert to take action if wanted, for example by contacting the first entity to assure security of accounts, to change sensitive passwords, and take actions as necessary or wanted for security and confidentiality.

The alert 314 and other referenced, described, implied, or inferred communications among the first entity 200, user(s) 110, the external system 202 serving as a validation entity computing system of a third entity or validation service entity, and the fourth entity computing system or device 204 can each be of one or more forms or formats, including, as non-limiting examples, internet transacted communications, emails, texts, and other types of signals, streams, and interactions.

In the illustrated example of the drawings, in which received replies 310 are deemed as repudiations, the multiple trials conducted in succession include variations with respect to the reset tool 330, which may include notifications of success or failure of any given trial. For example, the reset tool 330 is graphically represented in FIG. 5 as including a notification 340, stating "The phone number entered is either incorrect of invalid. Please try again." The notification 340 appears automatically as caused by the first entity computing system sending an update, addendum, or file/data replacement to effect an update/revision/addition at the requesting device 204, for example upon the first entity computing system receiving a reply 310 deemed a repudiation at a first, second or other trial.

In an alternative example in which the requesting device is one or more of the user devices (104, 106) of the specific user 110, the notification 340 (FIG. 5) informs the user of the failure of the attempt to change the value of the particular secure connection setting, which may represent merely a data entry error by the user or other benign circumstance. Having notice of the failure, the user can proceed with updated/correct information.

Figure 6:
FIG. 6 represents the display of maintained account records as shown in FIG. 2, with further reset tools and a further notification according to various embodiments of the present invention.

As described in the preceding, the first entity computing system conducts multiple trials in succession, and variations with respect to the reset tool 330 and/or display or condition caused thereby at the at the requesting device 204 and/or fourth party entity device 322. FIG. 6 represents the display 270 of maintained account records as shown in FIG. 2, with further reset tools for resetting respective secure connection settings. In the illustrated example, a reset tool 342 is provided for resetting a primary address, a reset tool 344 is provided for resetting a secondary mailing address, and a reset tool 346 is provided for resetting an email address. The display and/or condition represented in FIG. 6 further includes a notification 350, stating "Phone number not saved. Unfortunately, we can't process your request. You've exceeded your number of attempts. Please try again later." The notification 350 appears automatically as caused by the first entity computing system sending an update, addendum, or file/data replacement to effect an update/revision/addition at the requesting device 204, for example upon the first entity computing system receiving a reply 310 deemed a repudiation at a first, second, third or other trial.

Figure 7:
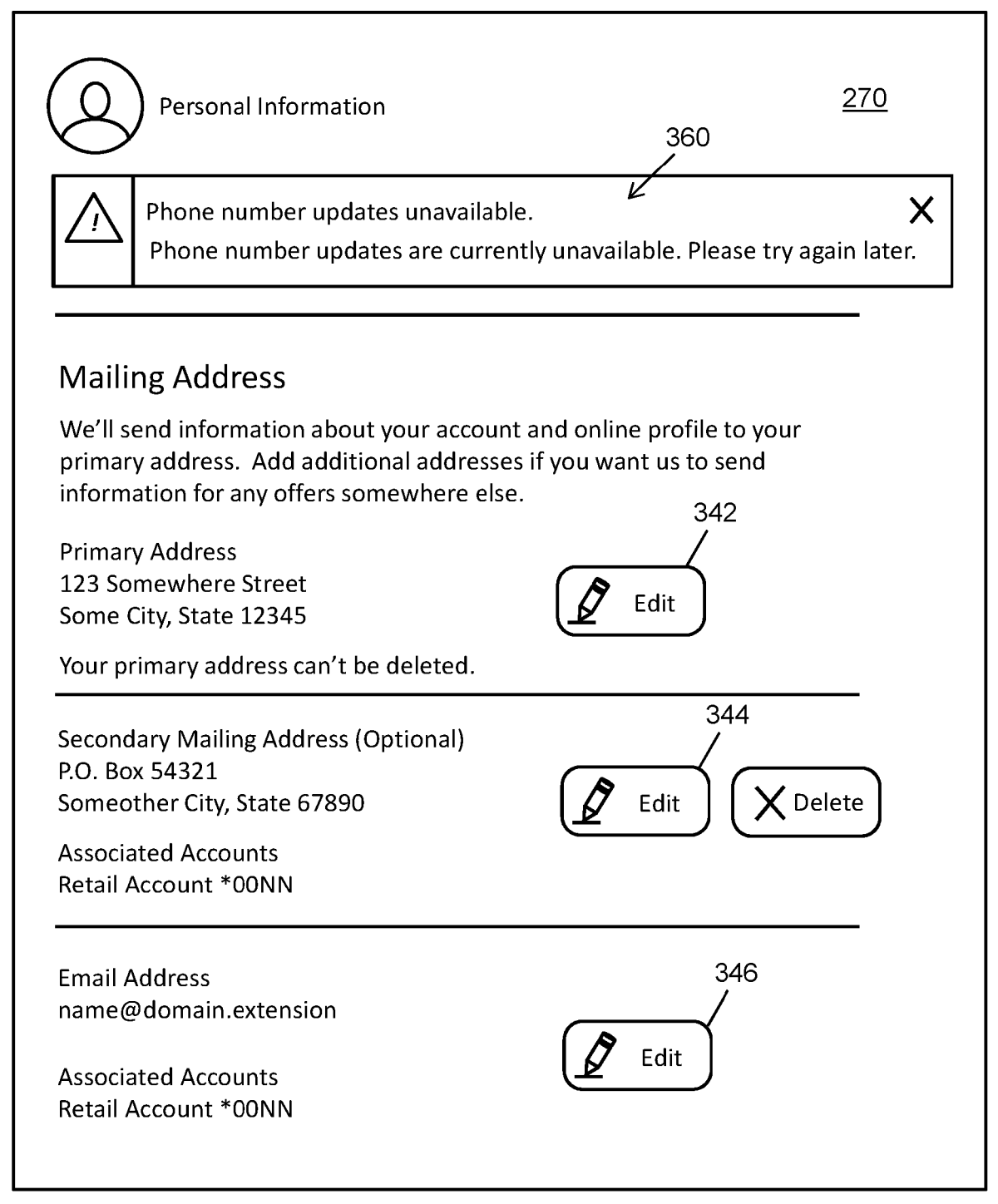

FIG. 7 represents the display 270 of maintained account records as shown in FIG. 2, with the reset tool 342, reset tool 344, reset tool 346 and a notification 360, stating "Phone number updates unavailable. Phone number updates are currently unavailable. Please try again later." The notification 360 appears automatically as caused by the first entity computing system sending an update, addendum, or file/data replacement to effect an update/revision/addition at the requesting device 204, for example upon the first entity computing system receiving a reply 310 for which the trial count reaches a predetermined condition as described in the preceding, and due to which the first entity computing system suspends the conducting of the multiple trials. The notification 360 thus corresponds to and/represents, in whole or in part, the denial message 312 (FIG. 3) sent to the requesting device.

Referring again to the alternative example in which the requesting device is one or more of the user devices (104, 106) of the specific user 110, the notification 350 (FIG. 6) and the notification 360 (FIG. 7) each inform the user of the failure of a respective attempt to change the value of a particular secure connection setting, which may represent merely a data entry error by the user or other benign circumstance. Having notice of the failure, the user can proceed with updated/correct information, for example after a delay in some implementations.

Whether referring to the illustrated example of attempts made by a malicious fourth entity 320 as in FIG. 3, or to the alternative example in which the requesting device is one or more of the user devices (104, 106) used authentically by the specific user 110, FIG. 7 represents a scenario in which the trial count has reached the predetermined condition, and current and/or immediate further trials are suspended, and the computing system further maintains the values for respective secure connection settings for the specific user against unassisted machine-conducted resets by preventing such resets. However, sets and resets of the secure connection settings for the specific user may be permitted with human assistance and/or human intervention, for example with attention and assistance by one or more human agent 210 of the first entity.

In some implementations, upon the trial count reaching the predetermined condition, the computing system maintains the values for respective secure connection settings for the specific user against unassisted machine-conducted resets, by preventing such resets, for a delay interval. The first entity computing system 206 may permit sets and resets, conducted for example by a human agent 210 of the first entity, within the delay interval. For example, the user 110 may be required to provide proof of identity by way of a voice phone call or a visit to a branch location of the first entity. The delay interval can vary among implementations. As a non-limiting example, the delay interval in some examples is twenty four hours. Other examples include, but are not limited to one calendar day, forty eight hours, two calendar days, and other time intervals.

Thus systems, devices, and methods are described and/or implied herein for restricting security connection data resets. Where functions and operations of systems and devices are expressly described, methods are as well within the scope of such descriptions by implication. Such systems, devices, and methods can be implemented with a reset tool, embodiments of use and/or displays of which are shown or implied in FIGS. 3-7, which together illustrate and exemplify an ordered sequence of multiple trials conducted in succession. Inventive aspects of the systems, devices, and methods are described herein improve the functioning of computer systems and networks by increasing the security of same against hacking and fraudulent access, thus better securing stored content and thwarting unauthorized transactions, loss of data and other resources.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. A system for restricting security connection data resets, the system comprising:

a computing system of a first entity including one or more processor configured to execute computer-readable instructions, at least one of a memory device and a non-transitory storage device maintaining values for respective secure connection settings for each user of multiple registered users each having one or more user device, and a communication interface for operatively connecting, via a communication network, the one or more processor to the one or more user device of each of the multiple registered users, and to a validation entity computing system of a validation service entity, wherein, upon execution of the computer-readable instructions, the computing system performs steps comprising, for a specific user of the multiple registered users upon receiving a reset request, from a requesting device, to reset the value of a particular secure connection setting of the secure connection settings for the specific user:

conducting multiple trials in succession, by, for each of the multiple trials:

providing a reset tool to the requesting device for input of a requested new value for the particular secure connection setting;

receiving the requested new value from the requesting device;
sending a validation request to the validation entity computing system, the validation request including, at least in part, the requested new value for the particular secure connection setting;
receiving, from the validation entity computing system, a repudiation of the requested new value for the particular secure connection setting; and
tolling a trial count, and
upon the trial count reaching a predetermined condition:
suspending the conducting of the multiple trials;
sending a denial message to the requesting device; and
sending an alert of the request to reset the value of a particular secure connection setting to at least one user device of the one or more user device of the specific user according to at least one maintained value of the secure connection settings for the specific user.

2. The system according to claim 1, wherein upon the trial count reaching a predetermined condition, the computing system further maintains the values for respective secure connection settings for the specific user against unassisted machine-conducted resets.

3. The system according to claim 2, wherein upon the trial count reaching a predetermined condition, the computing system further maintains the values for respective secure connection settings for the specific user against unassisted machine-conducted resets for a delay interval.

4. The system according to claim 3, wherein upon the trial count reaching a predetermined condition, the computing system further permits resets, conducted by a human agent of the first entity, within the delay interval, of the secure connection settings for the specific user.

5. The system according to claim 2, wherein the repudiation of the requested new value for the particular secure connection setting comprises a score assessing likelihood of authenticity of the requested new value for the particular secure connection setting.

6. The system according to claim 1, wherein maintaining values for respective secure connection settings comprises maintaining phone numbers and email addresses for user contact.

7. The system according to claim 1, wherein the reset request from the requesting computing device is initiated by a malicious entity.

8. The system according to claim 1, the validation request identifies the specific user.

9. A method for a computing system to restrict security connection data resets, the computing system being of a first entity and including one or more processor configured to execute computer-readable instructions, at least one of a memory device and a non-transitory storage device maintaining values for respective secure connection settings for each user of multiple registered users each having one or more user device, and a communication interface for operatively connecting, via a communication network, the one or more processor to the one or more user device of each of the multiple registered users, and to a validation entity computing system of a validation service entity, the method comprising, upon execution of the computer-readable instructions:
upon receiving a reset request, from a requesting device, to reset the value of a particular secure connection setting of the secure connection settings for a specific user of the multiple registered users:
conducting multiple trials in succession, by, for each of the multiple trials:
providing a reset tool to the requesting device for input of a requested new value for the particular secure connection setting;
receiving the requested new value from the requesting device;
sending a validation request to the validation entity computing system, the validation request including, at least in part, the requested new value for the particular secure connection setting;
receiving, from the validation entity computing system, a repudiation of the requested new value for the particular secure connection setting; and
tolling a trial count, and
upon the trial count reaching a predetermined condition:
suspending the conducting of the multiple trials;
sending a denial message to the requesting device; and
sending an alert of the request to reset the value of a particular secure connection setting to at least one user device of the one or more user device of the specific user according to at least one maintained value of the secure connection settings for the specific user.

10. The method according to claim 9, wherein upon the trial count reaching a predetermined condition, the computing system further maintains the values for respective secure connection settings for the specific user against unassisted machine-conducted resets for a delay interval.

11. The method according to claim 10, wherein upon the trial count reaching a predetermined condition, the computing system further permits resets, conducted by a human agent of the first entity, within the delay interval, of the secure connection settings for the specific user.

12. The method according to claim 9, wherein the repudiation of the requested new value for the particular secure connection setting comprises a score assessing likelihood of authenticity of the requested new value for the particular secure connection setting.

13. The method according to claim 9, wherein maintaining values for respective secure connection settings comprises maintaining data for user contact.

* * * * *